United States Patent
Yeh

(10) Patent No.: US 7,944,171 B2
(45) Date of Patent: May 17, 2011

(54) ATTACHABLE WIRELESS CHARGING DEVICE

(76) Inventor: Ming-Hsiang Yeh, Taipei (TW)

(*) Notice: Subject to any disclaimer, the term of this patent is extended or adjusted under 35 U.S.C. 154(b) by 357 days.

(21) Appl. No.: 12/292,972

(22) Filed: Dec. 2, 2008

(65) Prior Publication Data

US 2009/0184679 A1    Jul. 23, 2009

(30) Foreign Application Priority Data

Jan. 17, 2008  (TW) .............................. 97201034 U

(51) Int. Cl.
*H02J 7/00* (2006.01)
*H05K 1/00* (2006.01)
*B05D 5/12* (2006.01)

(52) U.S. Cl. ........ 320/108; 320/109; 320/139; 439/329; 439/591; 361/749; 361/761; 361/736; 361/720; 427/96.1; 427/207.1

(58) Field of Classification Search .................... 320/108
See application file for complete search history.

(56) References Cited

U.S. PATENT DOCUMENTS 5,949,213 A * 9/1999 Lanni ............................ 320/106
6,914,416 B2 * 7/2005 Thomas et al. ............... 320/136
6,986,965 B2 * 1/2006 Jenson et al. ................. 429/162
2002/0037756 A1 * 3/2002 Jacobs et al. ................. 455/572

* cited by examiner

*Primary Examiner* — Edward Tso
*Assistant Examiner* — Yalkew Fantu
(74) *Attorney, Agent, or Firm* — Rosenberg, Klein & Lee

(57) ABSTRACT

An attachable wireless charging device includes a carrier board, a receiving coil, a circuit board, and at least two conductive wires. The carrier board has a back surface on which an adhesive layer is coated. The receiving coil is formed in the carrier board. The circuit board is mounted to one side of the carrier board and includes a power receiving circuit, which includes a receiving control circuit, a resonance control circuit, a regulation circuit, a control circuit, a polarity selection circuit, and a circuit output section, which are electrically and sequentially connected. Electrical connection is established between the receiving control circuit and the receiving coil. The at least two conductive wires are arranged at one side of the circuit board and are electrically connectable with the circuit output section of the circuit board. As such, an attachable wireless charging device featuring automatic determination of polarity connection is provided.

8 Claims, 7 Drawing Sheets

ATTACHABLE WIRELESS CHARGING DEVICE

FIELD OF THE INVENTION

The present invention relates to an attachable wireless charging device, and in particular to an externally attachable charging device that comprises a combination of a carrier board, a receiving coil, a circuit board, and at least two conductive wires that features convenience of wireless charging, high charging performance without being shielded by an outer casing, automatic determination of polarity connection, repeated attachability, non-site-constrained, chargeability, and also offering a function of advertisement, and is applicable to various batteries and electronic devices.

BACKGROUND OF THE INVENTION

The development of wireless charging allows a portable electronic device, such as a mobile phone, a MP3 audio/video playing device, and a digital camera, to carry out power transmission and receiving through adoption of a wireless power receiving device. A user of the electronic device, when located outdoors, does not need to locate a wall outlet of an electric main before he or she can charge an exhausted battery of the electronic device. A conventional wireless charging device has a power receiving device that is often set inside an enclosure of a device that is powered by the battery to be charged, such as a receiving device of a wireless charging device for mobile phone battery. Such an arrangement causes a problem that the device enclosure is often made of a material comprising ferrous materials or aluminum or metal electroplating layers, which shield the transmission of wireless charging signals, thereby deteriorating the performance of wireless charging. As a consequence, the wireless charging cannot be widely accepted.

Thus, the present invention aims to provide an externally attachable wireless charging device for overcoming the above problems.

SUMMARY OF THE INVENTION

A primary objective of the present invention is to provide an attachable wireless charging device that comprises a combination of a carrier board, a receiving coil, a circuit board, and at least two conductive wires, wherein the receiving coil functions to receive electrical power transmitted from a power source transmitter in a wireless manner to realize wireless charging operation and the carrier board comprises an adhesive layer is externally attachable to an outer casing of a rechargeable battery and comprising conductive wires for electrical engagement with electrodes of the battery to effect wireless-receiving of electrical power and direct charging power to the battery whereby the problem of being shielded by an outer casing is eliminated and the practicability and convenience of the present invention is enhanced.

Another objective of the present invention is to provide an attachable wireless charging device that comprises a combination of a carrier board, a receiving coil, a circuit board, and at least two conductive wires, wherein the circuit board has a power receiving circuit that comprises a polarity selection circuit functioning to automatically determine the polarities through which charging operation is performed to thereby ensure charging protection for a rechargeable battery by preventing a rechargeable battery from being damaged due to reversed connection of the polarities, thereby enhancing the practicability and convenience of the present invention.

A further objective of the present invention is to provide an attachable wireless charging device that comprises a combination of a carrier board, a receiving coil, a circuit board, and at least two conductive wires, wherein the carrier board can be printed with various patterns to provide a function of advertisement, thereby enhancing the practicability and convenience of the present invention.

To realize the above objectives, the present invention provides an attachable wireless charging device comprising a carrier board, a receiving coil, a circuit board, and at least two conductive wires. The carrier board has a back surface on which an adhesive layer is coated. The receiving coil is formed in the carrier board. The circuit board is mounted to one side of the carrier board and comprises a power receiving circuit, which comprises a receiving control circuit, a resonance control circuit, a regulation circuit, a control circuit, a polarity selection circuit, and a circuit output section, which are electrically and sequentially connected. Electrical connection is established between the receiving control circuit and the receiving coil. The at least two conductive wires are arranged at one side of the circuit board and are electrically connectable with the circuit output section of the circuit board. As such, an attachable wireless charging device featuring automatic determination of polarity connection is provided.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
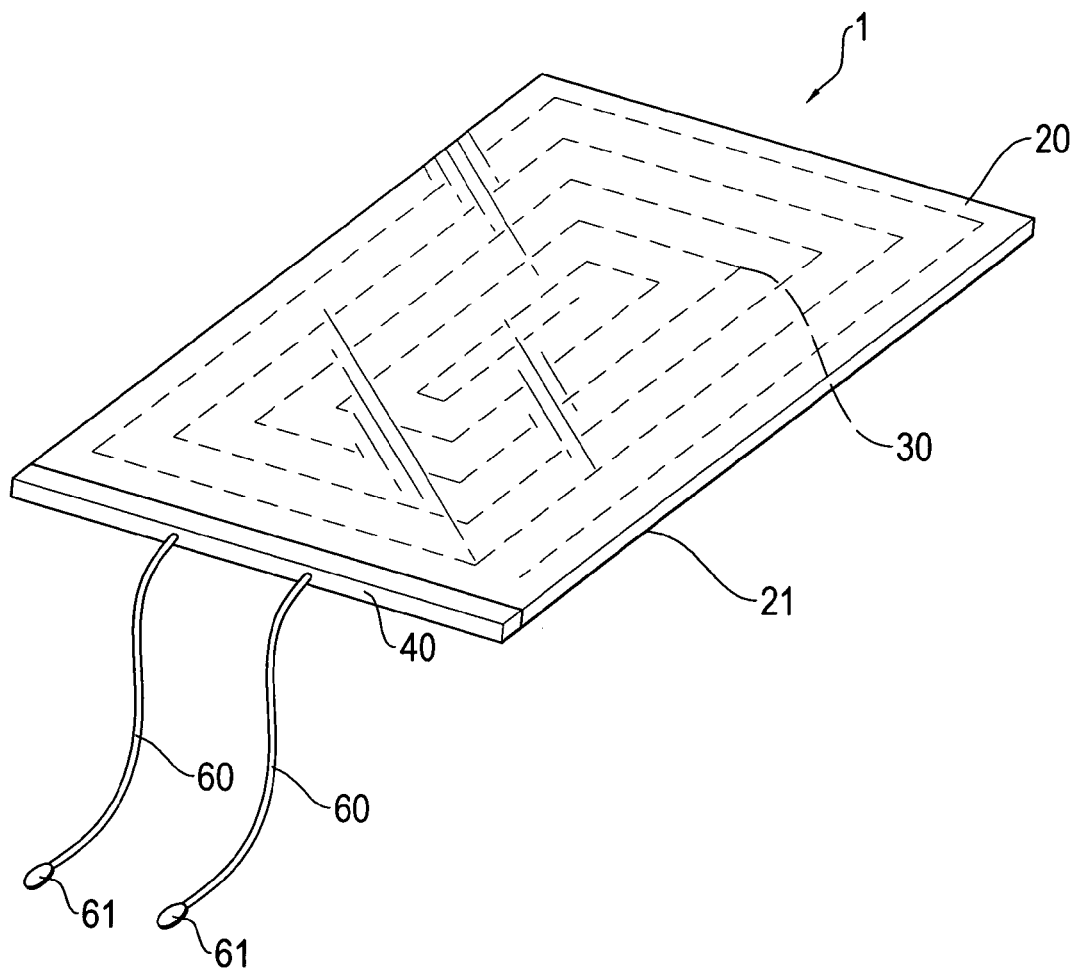
FIG. 1 is a perspective view showing an embodiment of the present invention.
Figure 2:
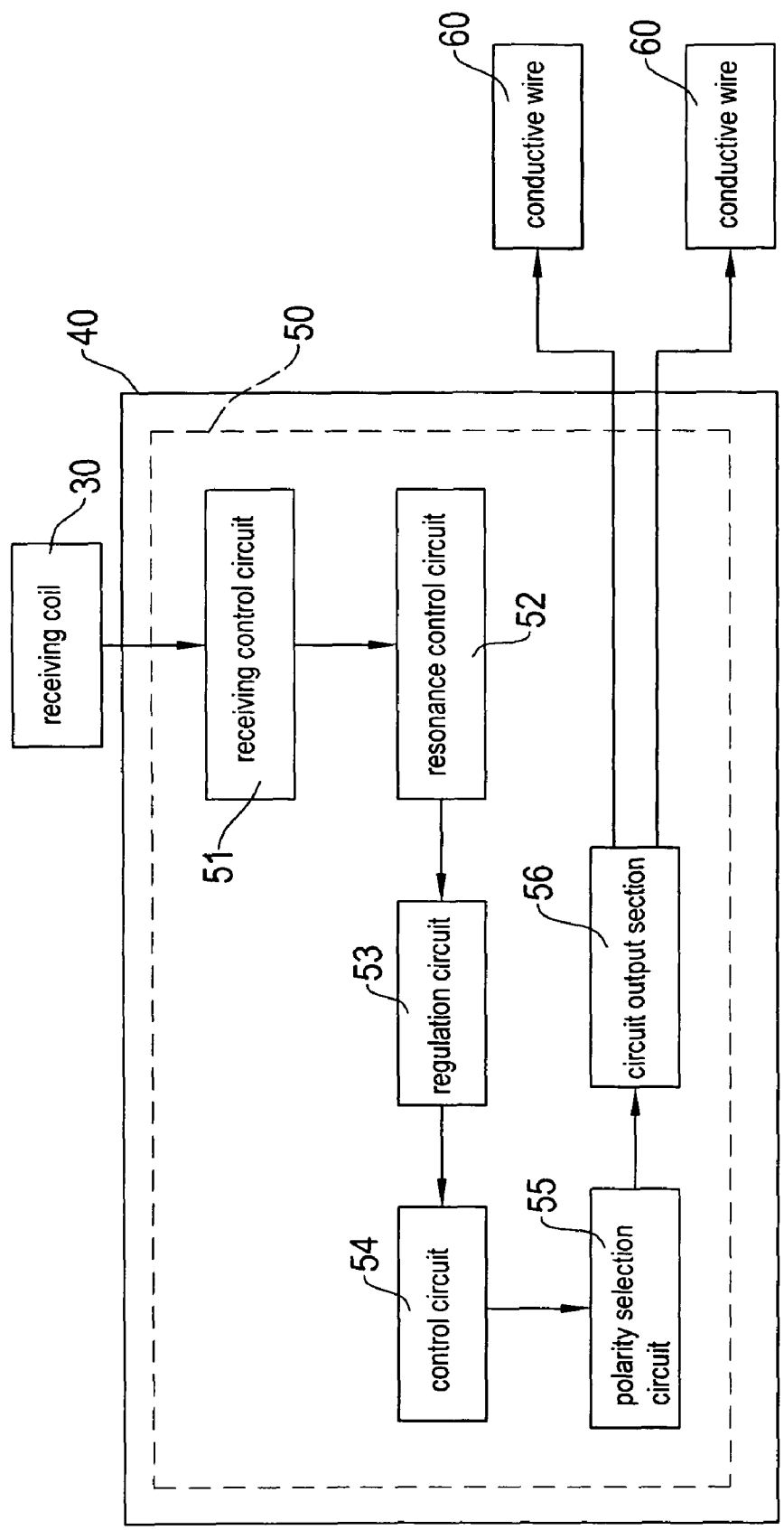
FIG. 2 is a system block diagram of the embodiment of the present invention.

With reference to FIGS. 1-4, the present invention provides an attachable wireless charging device, generally designated at 1. The wireless charging device 1 of the present invention comprises a carrier board 20, a receiving coil 30, a circuit board 40, and at least two conductive wires 60. The carrier board 20 has a back surface on which a layer of adhesive 21 is coated. The adhesive layer 21 preferably comprises a repeatedly attachable adhesive for repeatedly attaching the wireless charging device 1 to for example a rechargeable battery to be charged. The receiving coil 30 is formed in the carrier board 20. The circuit board 40 is mounted to one side of the carrier board 20. The circuit board 40 comprises a power receiving circuit 50, which is comprised of a receiving control circuit 51, a resonance control circuit 52, a regulation circuit 53, a control circuit 54, a polarity selection circuit 55, and a circuit output section 56, which are electrically and sequentially connected. Electrical connection is established between the receiving control circuit 51 and the receiving coil 30. The at least two conductive wires 60 are arranged at one side of the circuit board 40 and the two conductive wires 60 are electrically connected to the circuit output section 56 of the circuit board 40. As such, an attachable wireless charging device 1 featuring automatic determination of polarity connected is provided.

Figure 3:
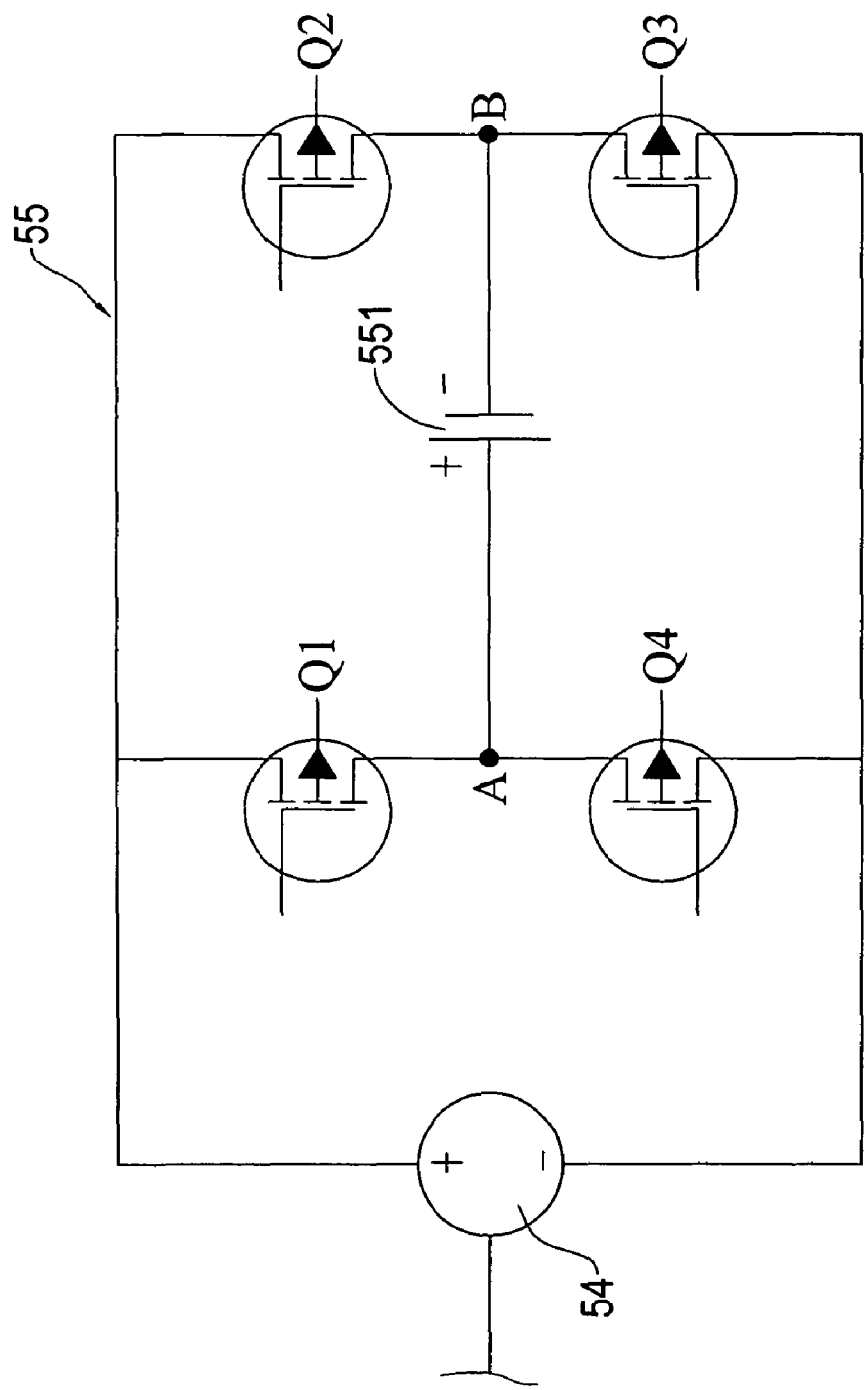
FIG. 3 is a circuit diagram of a polarity selection circuit of the embodiment of the present invention.

The circuit board 40 can be a flexible printed circuit. Each of the conductive wires 60 has an electrode connection terminal 61 for engaging an electrode of the rechargeable battery for transmission of electrical power therethrough. Referring to FIG. 3, the polarity selection circuit 55 of the power receiving circuit 50 of the circuit board 40 is comprised of four switches Q1, Q2, Q3, and Q4, and an electrical cell 551. Two (Q1, Q4) of the switches are connected in serial to each other as a first group, and the remaining two (Q2, Q3) of the switches are also connected in serial to each other as a second group. The two groups ((Q1, Q4) & (Q2, Q3)) of the serially connected switches are connected in parallel to the control circuit 54 respectively. The first group of the serially connected switches Q1, Q4 forms a polarity node A therebetween and the second group of the serially connected switches Q2, Q3 forms a polarity node B therebetween. The cell 551 is electrically connected between the two polarity nodes A, B. The two polarity nodes A, B are electrically connected to the circuit output section 56. The circuit output section 56 is electrically engageable with a rechargeable battery 70 through the conductive wires 60 to carry out a function of automatic determination of the polarity of the rechargeable battery 70 before charging to the rechargeable battery 70 is performed. The switches Q1-Q4 of the polarity selection circuit 55 can be P-channel enhancement MOSFETs (PMOSs) or N-channel enhancement MOSFETs (NMOSs). In the embodiment illustrated, the switches Q1, Q2 are PMOSs, while the switches Q3, Q4 are NMOSs.

Referring to FIG. 3, in the operation of the polarity selection circuit 55, when the polarity node A has a potential higher than that of the polarity node B, the switches Q1, Q3 are turned on, whereby a charging current is allowed to flow from the control circuit 54 through the switches Q1, Q3 and the polarity nodes A, B to the circuit output section 56, which is electrically connected to an end of each of the conductive wires 60, while the electrode connection terminal 61 formed at an opposite end of the conductive wire 60 is set in electrical engagement with one of the electrodes of the rechargeable battery 70, so as to complete a charging circuit (also see FIGS. 5 and 6) to effect charging of the rechargeable battery 70. On the other hand, when the potential of the polarity node B is higher than that of the polarity node A, the switches Q2, Q4 are turned on, whereby a charging current from the control circuit 54 is allowed to flow through the switches Q2, Q4 to complete a charging circuit with the rechargeable battery 70 so as to effect charging of the rechargeable battery 70. In this way, with the polarity selection circuit 55, the polarities of the electrodes of the rechargeable battery 70 to which the electrode connection terminals 61 of the conductive wires 60 are respectively connected can be automatically determined to effect proper switching between the two charging circuits thereby preventing damage to the rechargeable battery 70 due to reversed connection with the electrodes of the rechargeable battery 70. Thus, an effect for both charging and protection can be simultaneously achieved.

Figure 4:
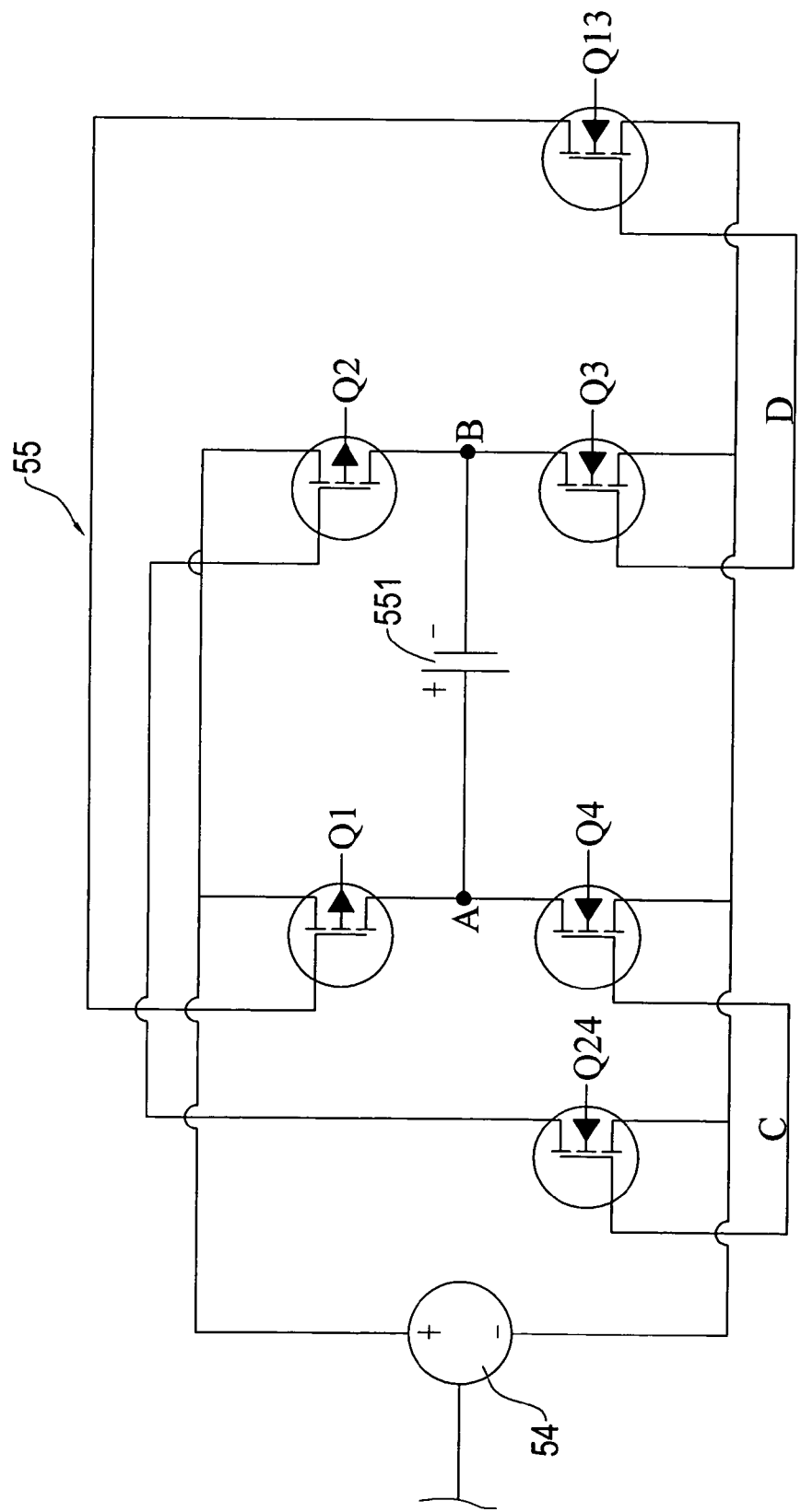
FIG. 4 is a circuit diagram of another polarity selection circuit of the embodiment of the present invention.

Referring to FIG. 4, in an alternative form of the polarity selection circuit 55, a protection switch Q13 is additionally connected in serial between the switches Q1, Q3 and also, a protection switch Q24 is additionally connected in serial between the switches Q2, Q4, the protection switches Q13, Q24 being in electrical connection with the control circuit 54. The protection switches Q13, Q24 of the polarity selection circuit 55 can be P-channel enhancement MOSFETs (PMOSs) or N-channel enhancement MOSFETs (NMOSs). In the embodiment illustrated, the two protection switches Q13, Q24 are NMOSs. In carrying out a charging operation, in case the potential of the polarity node A is higher than that of polarity node B, a driving voltage (which is the instant embodiment is set to 5V) is present in a conductive connection line D between the gates of the switch Q3 and the protection switch Q13 to have the switches Q1, Q3 turned on, similar to what described above (see FIG. 3), and the polarity nodes A, B are electrically connected to the circuit output section 56, which is electrically connected, via the conductive wires 60, to the rechargeable battery 70, so as to complete a charging circuit. On the other hand, when the potential of the polarity node B is higher than that of polarity node A, a driving voltage (which is the instant embodiment is set to 5V) is present in a conductive connection line C between the gates of the switch Q4 and the protection switch Q24 to have the switches Q2, Q4 turned on to form a charging circuit with the rechargeable battery 70 for charging the rechargeable battery 70. The protection switches Q13, Q24 serve as charging protection for the rechargeable battery 70 (also see FIGS. 5 and 6) to avoid reversal flow of the charging current.

Figure 5:
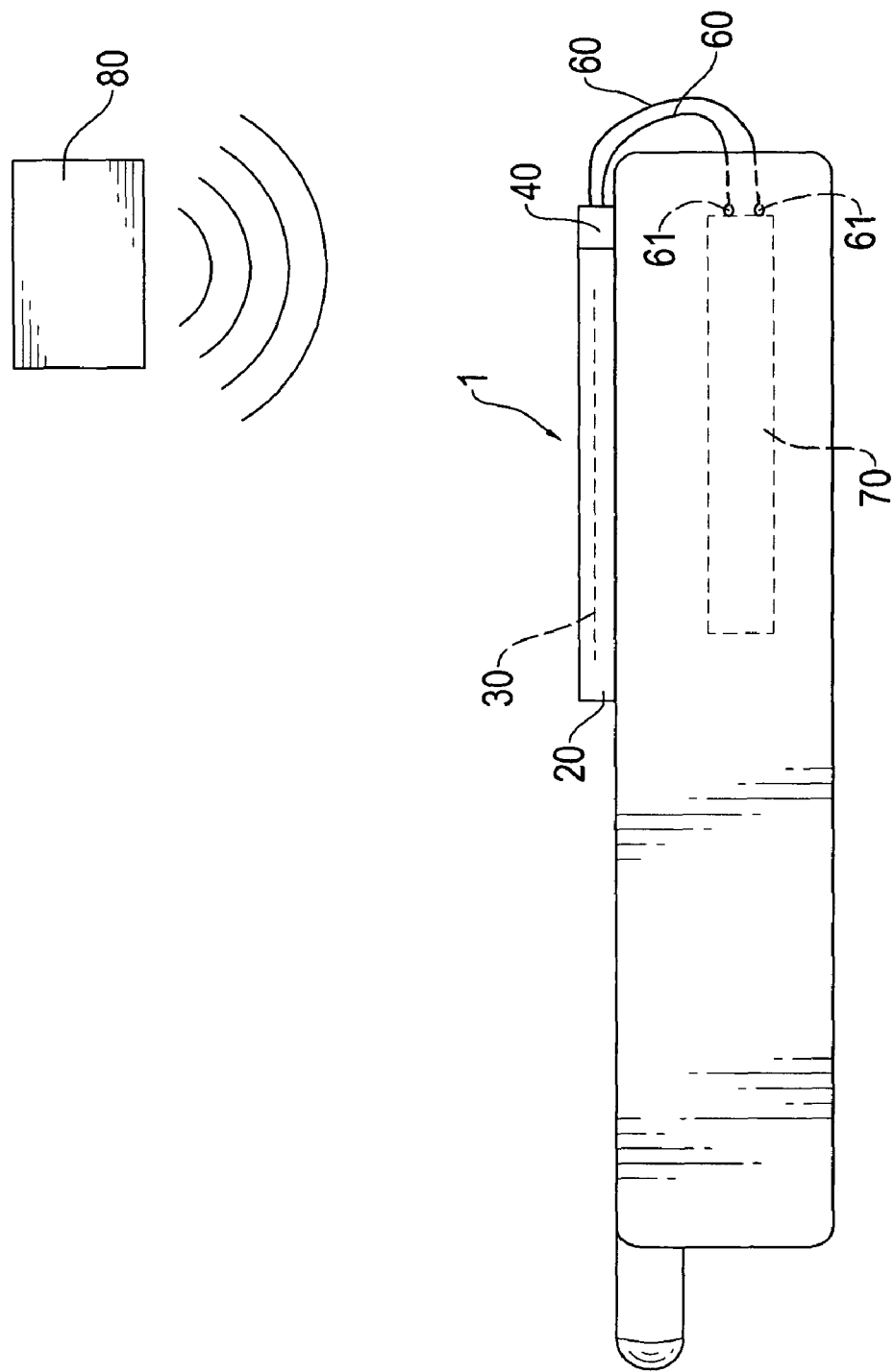
FIG. 5 a schematic view illustrating an application of the embodiment of the present invention.
Figure 6:
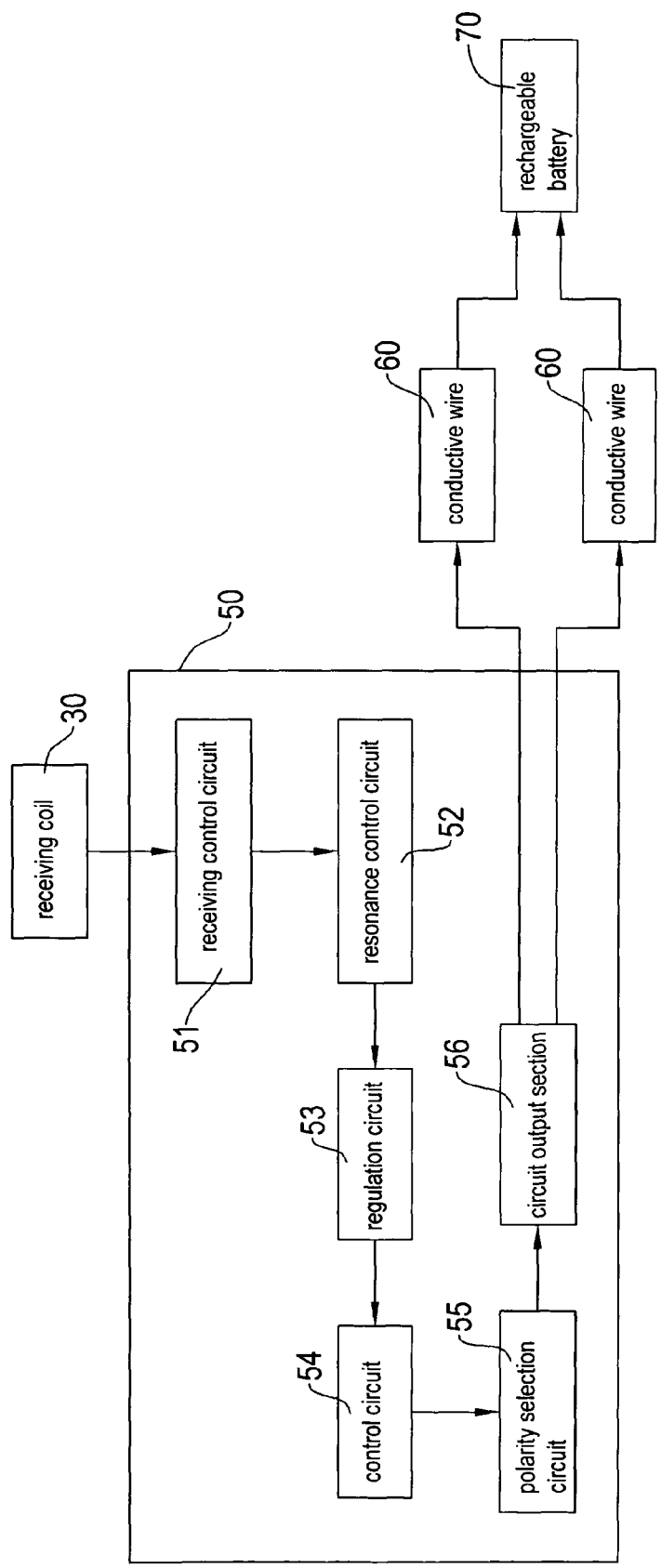
FIG. 6 is a block diagram of an application of the embodiment of the present invention.

Referring to FIGS. 5 and 6, which demonstrate the use of the present invention, the attachable wireless charging device 1 of the present invention comprises a combination of a carrier board 20, a receiving coil 30, a circuit board 40, and at least two conductive wires 60 and is directly attachable to a casing of a rechargeable battery 70 (such as a back cover of a mobile phone for the rechargeable battery as shown in FIG. 5) by means of the adhesive layer 21 of the carrier board 20 with the electrode connection terminals 61 of the two conductive wires 60 connected to the electrodes of the rechargeable battery 70 of the mobile phone to thereby complete the circuit connection for battery charging. When a power source transmitter 80 transmits electrical power in a wireless manner, the receiving coil 30 of the carrier board 20 receives the electrical power and applies the power to a receiving control circuit 51, a resonance control circuit 52, a regulation circuit 53, and a control circuit 54 of a power receiving circuit 50 of the circuit board 40 to provide a direct current for charging purposes; and through subsequent transmission to a polarity selection circuit 55, of which two polarity nodes A, B are connected to a circuit output section 56 of the circuit board 40, and further with the conductive wires 60 electrically connected to the circuit output section 56 and the electrode connection terminals 61 thereof set in electrical connection with electrodes of the rechargeable battery 70, a charging operation can be carried out. Due to the arrangement of the polarity selection circuit 55 in accordance with the present invention, the polarities of the electrodes of the rechargeable battery 70 connected to the attachable wireless charging device 1 can be automatically determined, whereby damage to the rechargeable battery 70 due to reversed connection of the electrode polarities can be avoided and the charging can be facilitated. Further, with the electrode connection terminals 61 of the two conductive wires 60 electrically connectable to the rechargeable battery 70, the problem of poor charging efficiency of the conventional wireless charging device caused by the charging device that is set inside the casing of the rechargeable battery 70 (such as a battery cover of a mobile phone) being shielded by the casing/cover.

Figure 7:
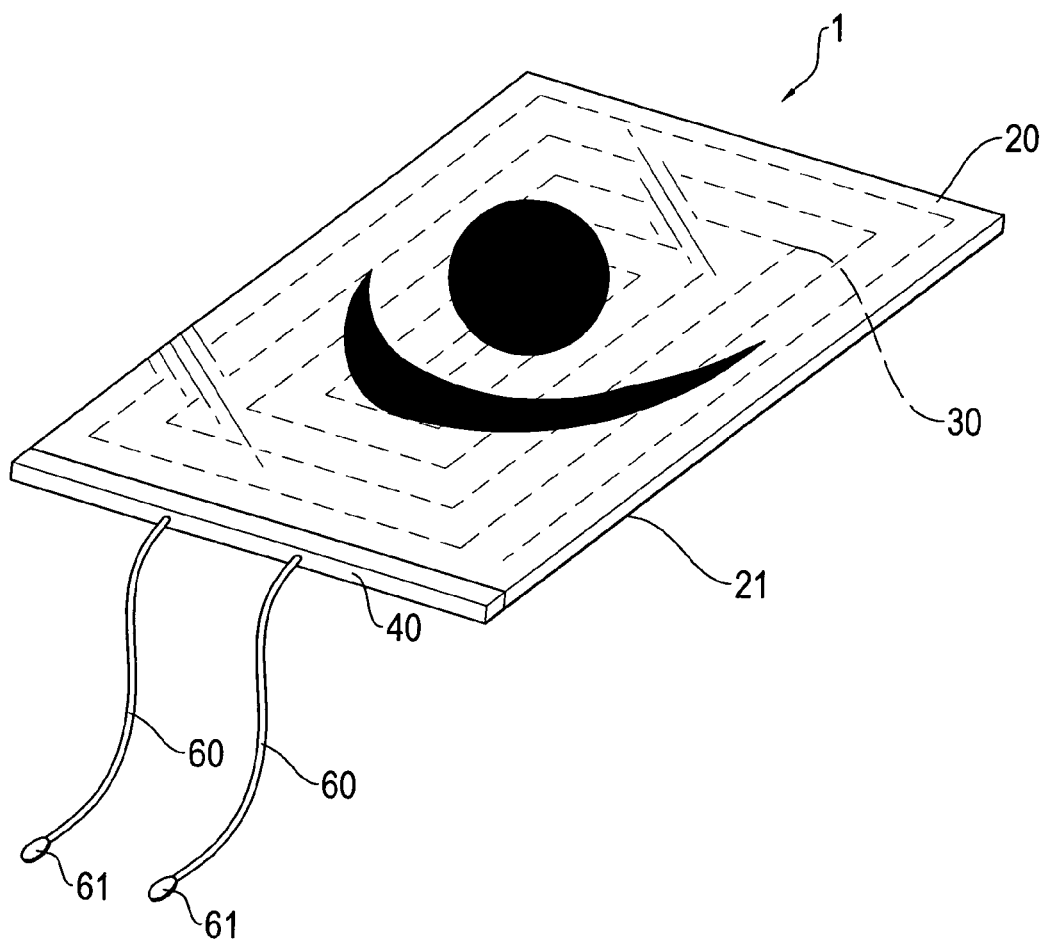
FIG. 7 is a perspective view showing another embodiment of the present invention.

Referring to FIGS. 1-7, the present invention provides an attachable wireless charging device 1 that features a combination of a carrier board 20, a receiving coil 30, a circuit board 40, and at least two conductive wires 60, wherein the receiving coil 30 functions to receive electrical power transmitted from a power source transmitter 80 in a wireless manner; further, the circuit board 40 has a power receiving circuit 50 that comprises a polarity selection circuit 55 functioning to automatically determine the polarities through which charging operation is performed to thereby ensure charging protection for a rechargeable battery 70 by preventing a rechargeable battery 70 from being damaged due to reversed connection of the polarities; further, the carrier board 20 has a adhesive layer 21 that is directly attachable to the outside of a casing of a rechargeable battery 70 (such as an outer cover of a mobile phone for the battery shown in FIG. 5), together with the two conductive wires 60 that selectively form electrical engagement with the rechargeable battery 70 to ensure charging operation to be carried out properly without being interfered with by not setting the wireless charging device inside the casing of the rechargeable battery 70 and thus shielded by the casing of the rechargeable battery 70 and deteriorating the charging performance, so that the present invention provides an excellent performance for power charging; further, the adhesive layer 21 of the carrier board 20 is made of a repeatedly attachable adhesive to allow for repeated attaching at any location so that the attachable wireless charging device 1 of the present invention can carry out power charging under various conditions, including outdoors and in movement, and various sites; further, the carrier board 20 can be printed with various patterns (as shown in FIG. 7) to allow the attachable wireless charging device 1 of the present invention, when attached to an outside casing of a battery (such as a rechargeable battery 70 of a mobile phone) to carry out charging operation, may also provide the function of advertisement; and conclusively, the wireless charging realized by the present invention is convenient, of excellent charging performance without being interfered with by an outer casing, capable to automatically determine the polarities to be charged, repeatedly attachable, having the function of advertisement, whereby the practicability and convenience of the present invention are enhanced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An attachable wireless charging device, comprising: a carrier board, which has a back surface on which an adhesive layer is coated; a receiving coil, which is formed in the carrier board; a circuit board, which is mounted to one side of the carrier board, the circuit board comprising a power receiving circuit, which comprises a receiving control circuit, a resonance control circuit, a regulation circuit, a control circuit, a polarity selection circuit, and a circuit output section, which are electrically and sequentially connected, electrical connection being established between the receiving control circuit and the receiving coil; and at least two conductive wires, which are arranged at one side of the circuit board and are electrically connected to the circuit output section of the circuit board; whereby an attachable wireless charging device featuring automatic determination of polarity connection for charging; wherein the polarity selection circuit of the power receiving circuit of the circuit board comprises; wherein the polarity selection circuit of the power receiving circuit of the circuit board comprises an electric cell, a first group of serially connected switches, and a second group of serially connected switches; the first group of serially connected switches forming a first polarity node therebetween, the second group of serially connected switches forming a second polarity node therebetween; the first and second polarity nodes being electrically connected to the circuit output section, the circuit output section being electrically engageable with a rechargeable battery through the conductive wires to carry out automatic determination of polarity connection with the rechargeable battery.

2. The attachable wireless charging device as claimed in claim 1, wherein the adhesive layer comprises a repeatedly attachable adhesive, adapted to be repeatedly attachable to an external object.

3. The attachable wireless charging device as claimed in claim 1, wherein the circuit board comprises a flexible printed circuit.

4. The attachable wireless charging device as claimed in claim 1, wherein each of the conductive wires has an electrode connection terminal for engaging an electrode of a battery for transmission of electrical power therethrough.

5. The attachable wireless charging device as claimed in claim 1, wherein the polarity selection circuit of the power receiving circuit of the circuit board comprises four switches, two of the switches being serially connected to each other as the first group, the remaining two of the switches being serially connected to each other as the second group, the two groups of the serially connected switches being connected in parallel to the control circuit respectively, the electrical cell being electrically connected between the first and second polarity nodes, whereby the rechargeable battery is protected from being damaged due to reverse polarity connection and thus facilitate charging of the rechargeable battery.

6. The attachable wireless charging device as claimed in claim 5, wherein the switches of the polarity selection circuit selectively comprise P-channel enhancement MOSFETs and N-channel enhancement MOSFETs.

7. The attachable wireless charging device as claimed in claim 5 further comprising a protection switch connected in serial between the two switches of at least one of the first and second groups, the protection switch being in electrical connection with the control circuit.

8. The attachable wireless charging device as claimed in claim 7, wherein the protection switch of the polarity selection circuit selectively comprises P-channel enhancement MOSFET and N-channel enhancement MOSFET.

* * * * *